United States Patent
Kwon et al.

(10) Patent No.: US 9,926,858 B2
(45) Date of Patent: Mar. 27, 2018

(54) CONTROL METHOD USING CONTINUOUS VARIABLE VALVE DURATION APPARATUS

(71) Applicant: HYUNDAI MOTOR COMPANY, Seoul (KR)

(72) Inventors: Kiyoung Kwon, Yongin-si (KR); Ingee Suh, Yongin-si (KR); Kyoung Pyo Ha, Seongnam-si (KR); In Sang Ryu, Incheon (KR); Back Sik Kim, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 127 days.

(21) Appl. No.: 14/954,849

(22) Filed: Nov. 30, 2015

(65) Prior Publication Data
US 2017/0082036 A1 Mar. 23, 2017

(30) Foreign Application Priority Data
Sep. 23, 2015 (KR) .................. 10-2015-0134955

(51) Int. Cl.
*F02D 13/02* (2006.01)
*F01L 13/00* (2006.01)
(Continued)

(52) U.S. Cl.
CPC .......... *F02D 13/0211* (2013.01); *F01L 1/053* (2013.01); *F01L 13/0015* (2013.01);
(Continued)

(58) Field of Classification Search
CPC . F01L 13/0015; F01L 2013/0084; F01L 1/34; F01L 1/0532; F01L 1/267; F01L 1/356; F02D 13/0211; F02D 13/0234
(Continued)

(56) References Cited

U.S. PATENT DOCUMENTS 6,999,864 B2* 2/2006 Iizuka .................. F01L 1/34
123/90.15
8,584,653 B2 11/2013 Tomimatsu et al.
(Continued)

FOREIGN PATENT DOCUMENTS

JP 2005-291186 A 10/2005
JP 2006-283636 A 10/2006
(Continued)

*Primary Examiner* — Mark Laurenzi
*Assistant Examiner* — Paul Thiede
(74) *Attorney, Agent, or Firm* — McDermott Will & Emery LLP (57) ABSTRACT

A control method using a continuous variable valve duration apparatus implements a continuous variable valve duration apparatus which includes a wheel mounted on a camshaft and having a wheel key so as to control duration of an intake valve of an engine, a cam unit having a cam and a cam key, adapted such that the camshaft is inserted thereinto, and being disposed so as to vary relative phase of the cam with respect to the camshaft, an inner bracket connected with the wheel key and the cam key, a slider housing being adapted such that the inner bracket is rotatably inserted thereinto and disposed so as to move vertically with respect to the engine, a controller varying a position of the slider housing so as to adjust rotation center of the inner bracket, and a guide unit guiding motion of the sliding housing. The control method includes calculating a required air amount for maintaining idle rotation speed of the engine by the controller when the engine is an idle state; mapping a supplied air amount in accordance with duration of the intake valve or the exhaust valve by the controller; setting a target valve duration for supplying the required air amount of the engine by the controller; and controlling duration of the intake valve or exhaust valve according to the set target valve duration by the controller.

3 Claims, 7 Drawing Sheets (51) Int. Cl.
  *F01L 1/053* (2006.01)
  *F01L 1/26* (2006.01)
  *F01L 13/08* (2006.01)
  *F01L 1/047* (2006.01)
  *F01L 1/356* (2006.01)

(52) U.S. Cl.
  CPC ............... *F01L 1/267* (2013.01); *F01L 1/356* (2013.01); *F01L 13/08* (2013.01); *F01L 2001/0473* (2013.01); *F01L 2013/0084* (2013.01); *F01L 2013/103* (2013.01); *F01L 2820/01* (2013.01); *Y02T 10/18* (2013.01)

(58) Field of Classification Search
  USPC .................................. 123/90.15, 90.16, 90.6
  See application file for complete search history.

(56) References Cited

U.S. PATENT DOCUMENTS

| | | | |
|---|---|---|---|
| 9,617,925 B2 * | 4/2017 | Kwon | ................. F02D 13/0234 |
| 9,803,519 B2 * | 10/2017 | Kwon | ....................... F01L 1/34 |
| 2017/0009669 A1 * | 1/2017 | Kwon | ................. F02D 13/0234 |

FOREIGN PATENT DOCUMENTS

| | | | |
|---|---|---|---|
| JP | 2009-203802 A | 9/2009 |
| JP | 2009-236010 A | 10/2009 |
| JP | 4556816 B2 | 10/2010 |
| KR | 10-2013-0063819 A | 6/2013 |

* cited by examiner

CONTROL METHOD USING CONTINUOUS VARIABLE VALVE DURATION APPARATUS

CROSS-REFERENCE TO RELATED APPLICATION

This application claims and the benefit of priority to Korean Patent Application No. 10-2015-0134955 filed in the Korean Intellectual Property Office on Sep. 23, 2015, the entire contents of which are incorporated herein by reference.

BACKGROUND (a) Field

The subject matter of this disclosure relates generally to a control method using a continuous variable valve duration apparatus, and more particularly to a control method using a continuous variable valve duration apparatus which can change opening duration of a valve using a simple configuration in accordance with operational states of an engine.

(b) Description of the Related Art

Generally, internal combustion engines generate power by receiving and burning air and fuel in a combustion chamber. An intake valve is operated by a camshaft, and air is charged into the combustion chamber while the intake valve is open. An exhaust valve is also operated by the camshaft, and air is discharged from the combustion chamber while the exhaust valve is open.

Optimal operation of the intake valve/exhaust valve, however, depends on the RPM of the engine. That is, an appropriate time for lifting or opening/closing the valves depends on the RPM of the engine. In order to implement an appropriate valve operation in accordance with the RPM of the engine, as described above, a CVVL (Continuously Variable Valve Lift) apparatus that has a plurality of different shapes of cams operating valves or that operates valves at different lifts in accordance with the RPM of an engine has been studied.

A CVVT (Continuous Variable Valve Timing) technique has been developed to adjust the opening duration of a valve, in which the timings of opening/closing a valve are simultaneously changed, with the valve duration being fixed.

However, the CVVL or the CVVT has a problem in that the configuration is complicated and the manufacturing cost high.

Originally, idle RPM of an engine is controlled by varying amount of air depending on operation of a throttle valve or changing ignition timing.

However, fuel consumption may deteriorate by inefficient driving of an engine while controlling idle RPM of an engine depending on ignition timing. In addition, there may be a limitation of vehicle speed while controlling idle RPM of an engine depending on the amount of air passing through a throttle valve.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a control method using a continuous variable valve duration apparatus having advantages of being able to adjust duration of valve lift in accordance with operational states of an engine.

A control method using a continuous variable valve duration apparatus according to an exemplary embodiment of the present invention may use a continuous variable valve duration apparatus which includes a wheel mounted on a camshaft and having a wheel key so as to control duration of an intake valve of an engine, a cam unit having a cam and a cam key, adapted so that that the camshaft is inserted thereinto, and disposed so as to vary the relative phase of the cam with respect to the camshaft, an inner bracket being connected with the wheel key and the cam key, a slider housing being adapted such that the inner bracket is rotatably inserted thereinto and being disposed so as to move vertically with respect to the engine, a controller varying a position of the slider housing so as to adjust rotation center of the inner bracket, and a guide unit guiding motion of the sliding housing. The control method may include calculating the amount of air required for maintaining idle rotation speed of the engine by the controller when the engine is in an idle state; mapping a supplied air amount in accordance with duration of the intake valve or the exhaust valve by the controller; setting a target valve duration for supplying the required air amount of engine air determined by the controller; and controlling duration of the intake valve or exhaust valve according to the target valve duration set by the controller.

Setting the target valve duration may be performed on the basis of a map of the relation between the duration of the intake valve or exhaust valve and the supplied air amount.

The control method may terminate when the controller 100 recognizes that idle RPM of engine is maintained.

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention Like reference numerals are given to like components throughout the specification.

Throughout the specification, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

Figure 1:
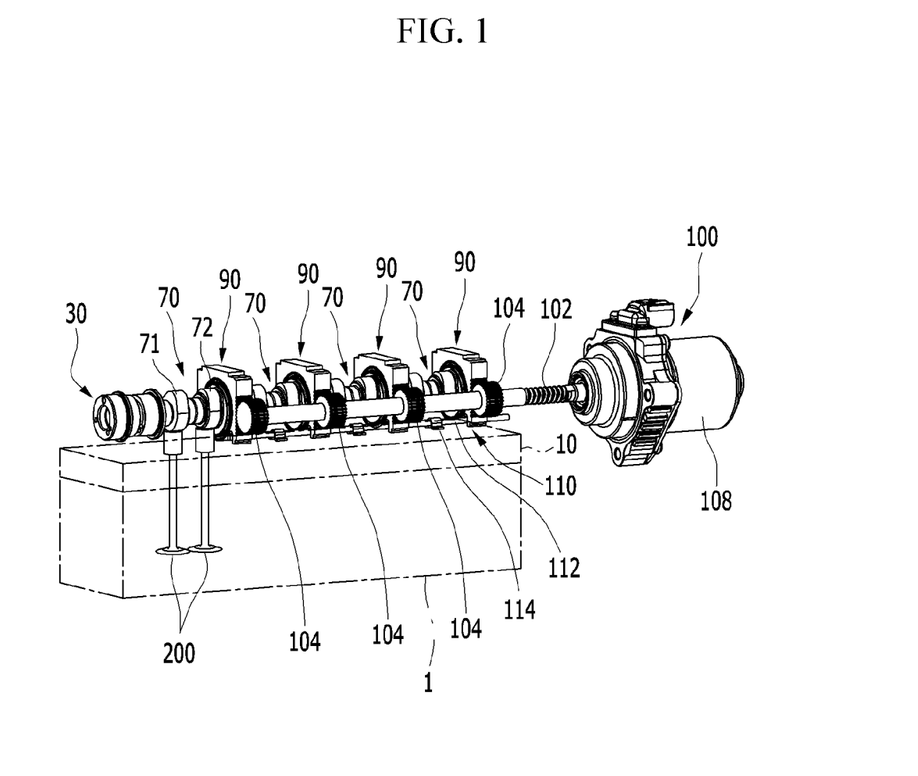
FIG. 1 is a perspective view an engine equipped with a continuous variable valve duration apparatus according to an exemplary embodiment of the present invention.
Figure 2:
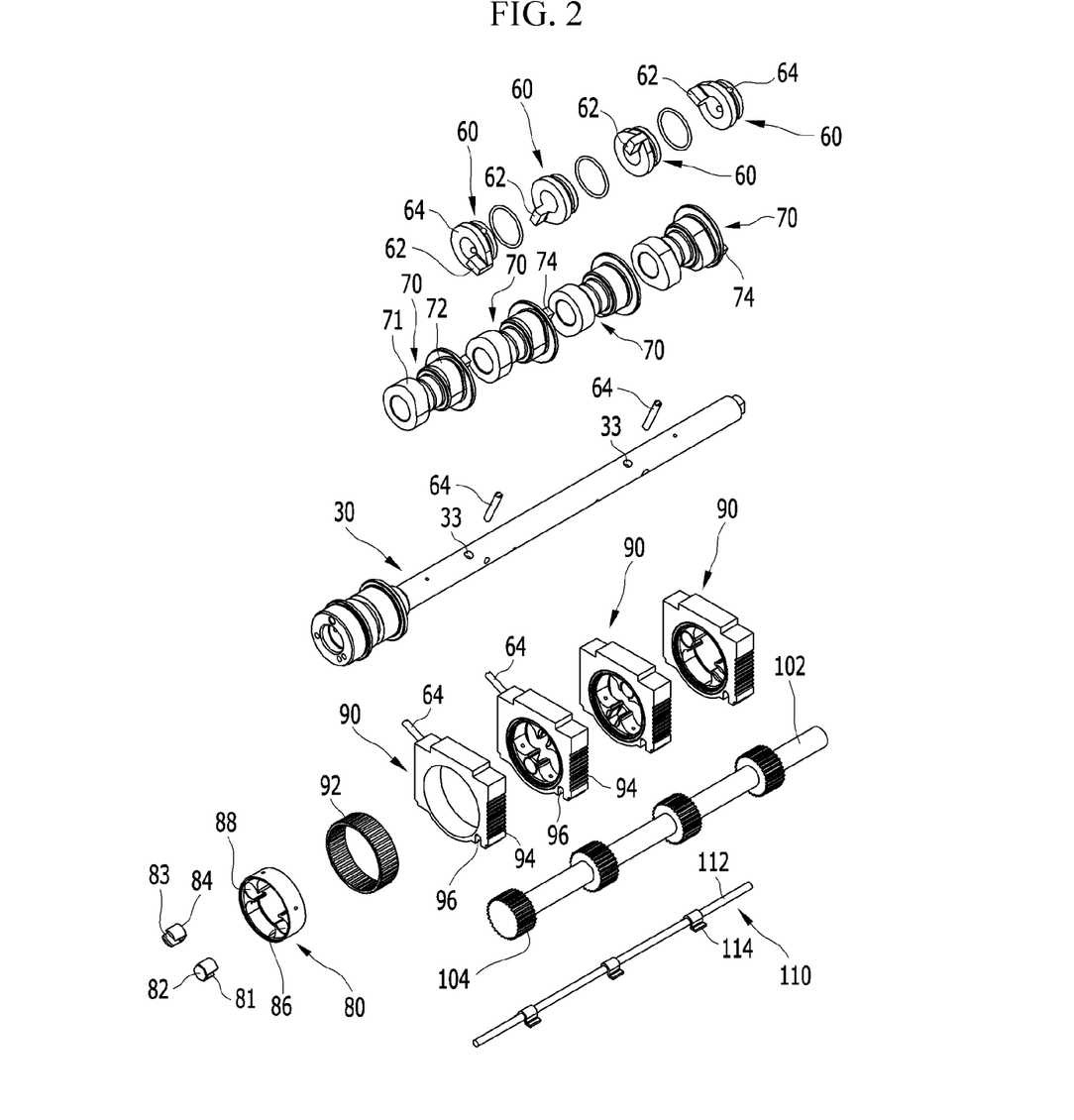
FIG. 2 is an exploded perspective view of the continuous variable valve duration apparatus according to an exemplary embodiment of the present invention.
Figure 3:
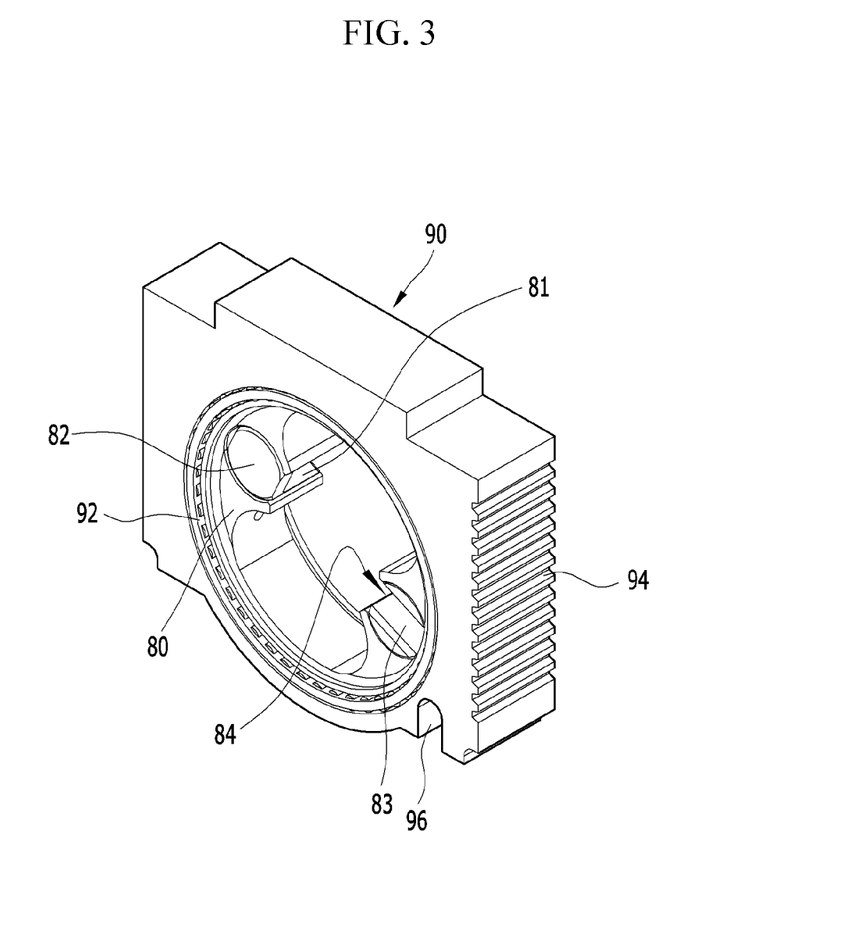
FIG. 3 and FIG. 4 are partial exploded perspective views of the continuous variable valve duration apparatus according to an exemplary embodiment of the present invention.
Figure 4:
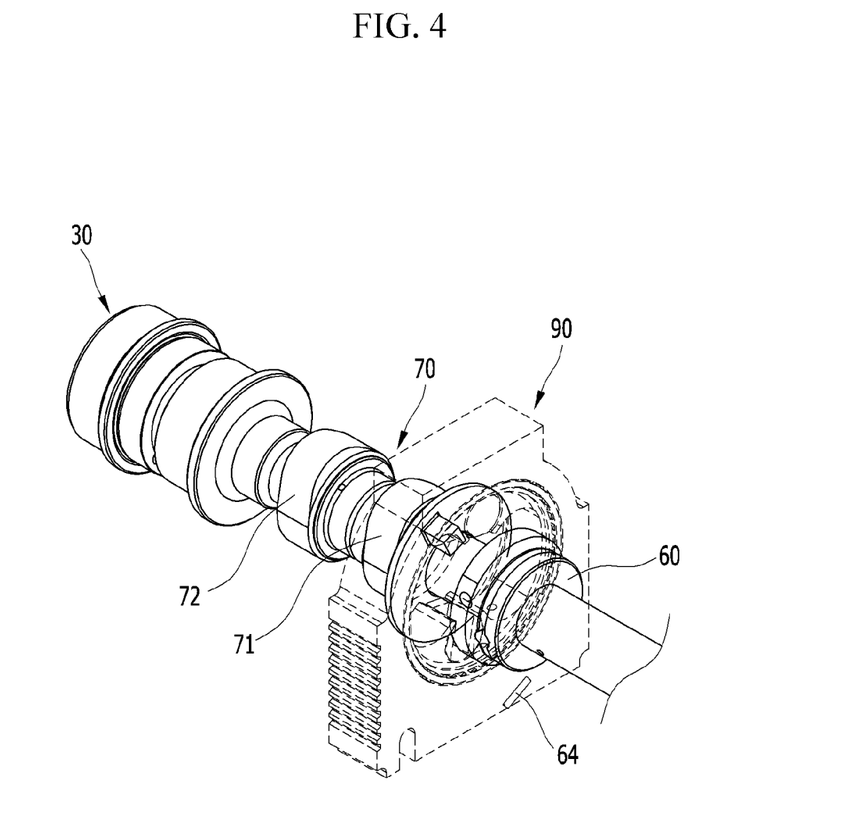

FIG. 1 is a perspective view an engine equipped with a continuous variable valve duration apparatus according to an exemplary embodiment of the present invention, FIG. 2 is an exploded perspective view of the continuous variable valve duration apparatus according to an exemplary embodiment of the present invention, and FIG. 3 and FIG. 4 are partial exploded perspective views of the continuous variable valve duration apparatus according to an exemplary embodiment of the present invention.

Referring to FIG. 1 to FIG. 4, an engine according to an exemplary embodiment of the present invention includes an engine block 1, a cylinder head 10 mounted on the engine block 1, and a continuous variable valve duration apparatus mounted on the cylinder head 10.

Still referring to the same FIGS., a continuous variable valve duration apparatus applicable to an engine according to an exemplary embodiment of the present invention includes a camshaft 30; a plurality of wheels 60 mounted on the camshaft 30, each having a wheel key 62, and corresponding to cylinders, respectively; a plurality of cam units 70 having cams 71 and 72 and a cam key 74, in which the camshaft 30 is inserted, that have variable relative phases of the cams 71 and 72 with respect to the camshaft 30, and correspond to the cylinders, respectively; a plurality of inner brackets 80 that are connected to the wheel keys 62 and the cam keys 74; a plurality of slider housings 90 in which the inner brackets 80 are rotatably inserted and that can move vertically with respect to the engine; a controller 100 that adjusts the positions of the rotational centers of the inner brackets 80 by changing the positions of the slider housings 90; and a guide unit 110 that guides the slider housings 90.

The camshaft 30 may be an intake camshaft or an exhaust camshaft.

Although two cams 71 and 72 are shown in the drawings, the present invention is not limited thereto.

The valve 200 contacts with the cams 71 and 72 so as to be opened/closed.

Fastening holes 33 are formed at the camshaft 30, and the wheels 60 can be combined with the camshaft 30 by connecting pins 64. Coupling springs 66 are mounted on the wheels 60, so they can prevent separation of the connecting pins 64.

The continuous variable valve duration apparatus further includes first pins 82 having a sliding key slot 81 in which the wheel key 62 is slidably inserted and second pins 84 having a sliding key slot 83 in which the cam key 74 is slidably inserted. The inner bracket 80 has first and second pin holes 86 and 88 in which the first pin 82 and the second pin 84 are inserted, respectively.

The first and second pins 82 and 84 have the shape of a cylinder and are rotatably inserted in the first and second pin holes 86 and 88.

Accordingly, since the first and second pins 82 and 84 and the first and second sliding pin holes 86 and 88 are formed in the shape of a cylinder, abrasion resistance can be improved.

Further, productivity can be assured by the simple shape of the first and second pins 82 and 84 and the first and second sliding pin holes 86 and 88.

The sliding key slots 81 and 83 of the first and second pins 82 and 84 are formed in opposite directions, and the wheel key 62 and the cam key 74 can be inserted therein.

The first and second pin holes 86 and 88 may be partially open in order not to interfere with movement of the wheel key 62 and the cam key 72.

A needle bearing 92 may be disposed between the slider housing 90 and the inner bracket 80, so that the slider housing 90 and the inner bracket 80 can easily rotate relative to each other and rigidity can be secured.

Control teeth 94 are formed on a side of each of the slider housings 90, and the controller 100 includes a control shaft 102 that is parallel with the camshaft 30 and has control gears 104 engaged with the control teeth 94, and a motor 108 that selectively rotates the control shaft 102.

The guide unit 110 includes a guide bar 112 guiding the slider housings 90 and guide brackets 114 fixing the guide bar 112, and a guide slot 96 in which the guide bar 112 is inserted is formed in the slider housings 90.

Figure 5:
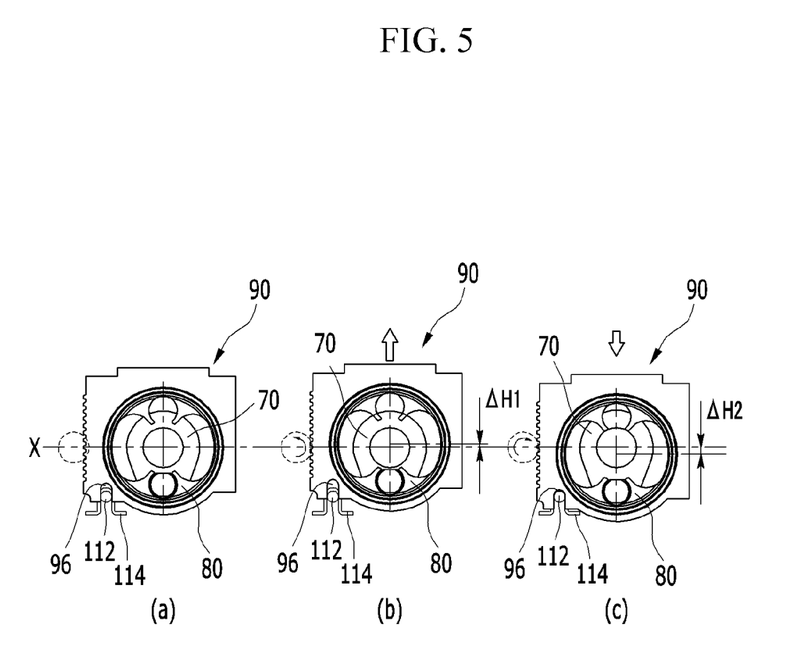
FIG. 5 is a view illustrating the operation of the continuous variable valve duration apparatus according to an exemplary embodiment of the present invention.
Figure 6:
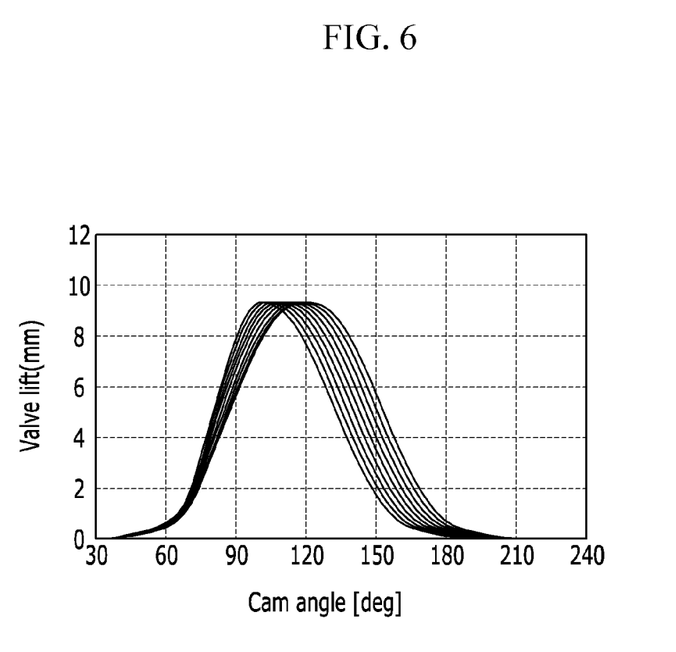
FIG. 6 is a graph showing a valve profile of the continuous variable valve duration apparatus according to an exemplary embodiment of the present invention.

FIG. 5 is a view showing operation of the continuous variable valve duration apparatus according to an exemplary embodiment of the present invention, and FIG. 6 is a graph showing a valve profile of the continuous variable valve duration apparatus according to an exemplary embodiment.

Hereinafter, the operation of the continuous variable valve duration apparatus according to an exemplary embodiment of the present invention is described with reference to FIG. 1 to FIG. 6.

In accordance with the operational states of an engine, the motor 108 of the controller 100 operates and changes the relative positions of the slider housings 90.

For example, in (a) of FIG. 5, as the motor 108 operates, the control shaft 102 rotates, so that when the position of the slider housing 90 changes toward upward, the rotational center of the inner bracket 80 moves by $\Delta H1$, as in (b) of FIG. 5, or when the position of the slider housing 90 changes toward downward, the rotational center of the inner bracket 80 moves by $\Delta H2$, as in (c) of FIG. 5.

As the position of the rotational center of the inner bracket 80 changes, the rotational acceleration of the cam unit 70 changes and valve duration changes accordingly.

As shown in FIG. 6, the maximum lift of the valve 200 is constant, and as the position of the slider housing 90 changes, the relative rotational speed of the cams 71 and 72 to the camshaft 30 changes, the timing for opening/closing the valve 200 changes, and accordingly, the duration of the valve 200 changes. On the other hand, in order to control ability of a vehicle to decelerate, the duration can be adjusted with the opening timing of an intake valve maximally advanced so that pumping loss by an engine is large.

Figure 7:
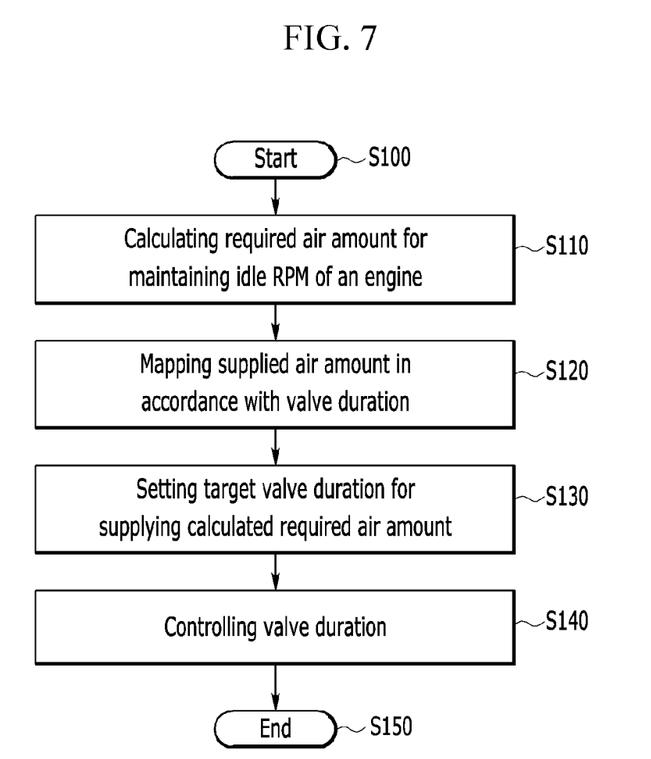
FIG. 7 is a flowchart illustrating a control method using the continuous variable valve duration apparatus according to an exemplary embodiment of the present invention.

FIG. 7 is a flowchart illustrating a control method using the continuous variable valve duration apparatus according to an exemplary embodiment of the present invention.

As illustrated in FIG. 7, a control method using the continuous variable valve duration apparatus according to an exemplary embodiment of the present invention implements controlling idle RPM of an engine by controlling the duration of the valve.

If an engine attains an idle state at a step S100, an electronic control unit (ECU) calculates the amount of air required for maintaining idle RPM of an engine at a step S110. Herein, the ECU may be a controller 100 as a common system mounted on vehicles to generally control electronic devices in the vehicles, well known to those skilled in the art, and hence detailed description is not provided.

If the amount of air which is required for maintaining idle RPM of an engine is calculated at step S110, the controller

100 maps the amount of air being supplied according to the valve duration at step S120. In addition, the controller 100 sets a target valve duration for supplying the calculated required air amount according to the mapped relation between the valve duration and the supplied air amount at step S130.

If the target valve duration is set at step S130, the controller 100 controls the duration of the valve 200 according to the set target valve duration at step S140. At this time, controlling of the valve 200 duration is performed as the controller 100 controls the motor 108. Herein, the valve 200, whose duration is controlled, may be an intake valve or an exhaust valve. In addition, idle RPM of the engine is maintained although the state of the engine is rapidly changed as the valve 200 duration is controlled. Furthermore, when the controller 100 recognizes that idle RPM of engine is maintained, a control method using a continuous variable valve duration apparatus according to an exemplary embodiment of the present invention is ended at step S150.

According to a control method using a continuous variable valve duration apparatus according to an exemplary embodiment of the present invention, idle RPM of the engine can be controlled without limitation based on inefficient driving of the engine or vehicle speed as duration of valve lift is controlled by using a continuous variable valve duration apparatus which can adjust duration of the valve lift of simple configuration in accordance with operational states of an engine.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A control method using a continuous variable valve duration apparatus which comprises a wheel mounted on a camshaft and having a wheel key so as to control duration of an intake valve or an exhaust valve of an engine, a cam unit having a cam and a cam key, being adapted such that the camshaft is inserted thereinto, and being disposed so as to be able to vary a relative phase of the cam with respect to the camshaft, an inner bracket being connected with the wheel key and the cam key, a slider housing being adapted such that the inner bracket is rotatably inserted thereinto and being disposed so as to move vertically with respect to the engine, a controller varying a position of the slider housing so as to adjust rotation center of the inner bracket, and a guide unit guiding motion of the sliding housing, the control method comprising:

calculating an air amount required for maintaining idle rotation speed of the engine by the controller when the engine is operating in an idle state;

mapping a supplied air amount in accordance with duration of the intake valve or the exhaust valve by the controller;

setting a target valve duration for supplying the required air amount of the engine by the controller; and controlling duration of the intake valve or exhaust valve according to the set target valve duration by the controller.

2. The control method of claim 1, wherein the setting the target valve duration is performed on basis of a map of a relation between the duration of the intake valve or the exhaust valve and the supplied air amount.

3. The control method of claim 1, wherein the control method ends when the controller recognizes that engine idle RPM is maintained.

* * * * *